US012712412B2

(12) United States Patent
Ruppert et al.

(10) Patent No.: US 12,712,412 B2
(45) Date of Patent: Aug. 18, 2026

(54) HIGH-VOLTAGE TERMINAL

(71) Applicant: Schaeffler Technologies AG & Co. KG, Herzogenaurach (DE)

(72) Inventors: Andreas Ruppert, Bühlertal (DE); Rebecca Ruppert, Bühlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 413 days.

(21) Appl. No.: 18/271,266

(22) PCT Filed: Jan. 12, 2022

(86) PCT No.: PCT/DE2022/100011
§ 371 (c)(1), (2) Date: Jul. 7, 2023

(87) PCT Pub. No.: WO2022/152349
PCT Pub. Date: Jul. 21, 2022

(65) Prior Publication Data

US 2024/0063676 A1 Feb. 22, 2024

(30) Foreign Application Priority Data

Jan. 15, 2021 (DE) ......................... 102021100731.3

(51) Int. Cl.
*H02K 3/50* (2006.01)
*H02K 5/22* (2006.01)

(52) U.S. Cl.
CPC ............... *H02K 5/225* (2013.01); *H02K 3/50* (2013.01); *H02K 2203/09* (2013.01)

(58) Field of Classification Search
CPC ............ H02K 5/225; H02K 3/50; H02K 3/12; H02K 15/043; H02K 1/16; H02K 3/28; H02K 2203/09
USPC ........................................................... 310/71
See application file for complete search history.

(56) References Cited

U.S. PATENT DOCUMENTS

2016/0020660 A1 1/2016 Houzumi et al.
2018/0097416 A1 4/2018 Dang
2019/0006905 A1* 1/2019 Lindwurm ............. H02K 3/522
2020/0106328 A1 4/2020 Kim
2021/0359568 A1* 11/2021 Goto ........................ H02K 3/50
(Continued)

FOREIGN PATENT DOCUMENTS

CN 208986716 6/2019
DE 102019202911 9/2020
DE 102019202912 9/2020
(Continued)

*Primary Examiner* — Alexander A Singh
(74) *Attorney, Agent, or Firm* — Volpe Koenig

(57) ABSTRACT

A high-voltage terminal for a stator, including: —three bus bars for electrically connecting the HV terminal to power electronics; and —a star bar; wherein each of the three bus bars has a current input element and at least n parallel current output elements, and the star bar has at least 3n current input elements, n being greater than or equal to 4, and wherein, within the HV terminal, the bars are stacked one on top of the other to form a bar stack and are arranged such that they are electrically insulated from one another by at least one plastics element, more particularly are electrically insulated from one another in a plastics element, and preferably are embedded therein.

18 Claims, 8 Drawing Sheets

(56) References Cited

U.S. PATENT DOCUMENTS

| | | | | |
|---|---|---|---|---|
| 2022/0320937 | A1 * | 10/2022 | Takada | H02K 3/50 |

FOREIGN PATENT DOCUMENTS

| | | |
|---|---|---|
| DE | 102019111825 | 11/2020 |
| EP | 3567703 | 10/2021 |
| JP | 2020167788 | 10/2020 |

* cited by examiner

HIGH-VOLTAGE TERMINAL

CROSS-REFERENCE TO RELATED APPLICATION

This application is the U.S. National Phase of PCT Appln. No. PCT/DE2022/100011, filed Jan. 12, 2022, which claims priority from German Patent Application No. 10 2021 100 731.3, filed Jan. 15, 2021 the entire disclosures of which are incorporated by reference herein.

TECHNICAL FIELD

The present disclosure relates to a high-voltage terminal for a stator and to a method for producing the high-voltage terminal according to the disclosure. In a further aspect, the present disclosure relates to a stator winding, in particular made up of a continuous mat, or a stator comprising the high-voltage terminal according to the disclosure, and to an electrical machine comprising the high-voltage terminal according to the disclosure, the stator winding according to the disclosure or the stator according to the disclosure.

BACKGROUND

Permanently excited synchronous machines (PSM) are already used in many industrial applications and, in the course of the planned full-scale electrification, increasingly also in the automotive industry. Such a permanently excited synchronous machine usually has a stator to be energized and a permanently excited rotor. The stator comprises, among other things, a wire winding, a stator carrier, an interconnection ring, and a terminal for the power electronics.

Electrical machines with distributed winding or wave winding usually have an interconnection region in which different conductors of the winding are connected to one another. This coupling is also referred to as a bridge, which is usually responsible for reversing the direction of the current flow. Furthermore, the interconnection can also contain a so-called star point. At this point, all conductors and currents of the different phases flow together according to a star connection. As a further component, the electrical machine has a high-voltage terminal. This component is responsible for the power supply of the electrical machine via the power electronics.

High-voltage terminals are now known from the state of the art. For example, DE 10 2019 111 825 A1 discloses a stator for an electrical machine with such a high-voltage terminal.

Although such components are known from the prior art, there still exists a desire to optimize them.

SUMMARY

Therefore, it is the object of the present disclosure to provide a high-voltage terminal that is improved compared to the prior art, in particular to provide a high-voltage terminal that allows integration into a limited installation space of a stator winding in a way that is as compact as possible.

In a further aspect, it is an object of the present disclosure to provide a method for producing such a high-voltage terminal.

Furthermore, it is an object of the present disclosure to provide a stator winding that is improved compared to the prior art, a stator that is improved compared to the prior art, and an electrical machine that is improved compared to the prior art.

According to the disclosure, the object is achieved according to a first aspect by a high-voltage terminal, in a second aspect by a method, in a third aspect by a stator winding or a stator, and in a fourth aspect by an electrical machine, each having one or more of the features disclosed herein.

The high-voltage terminal for a stator according to the disclosure comprises three bus bars for electrically connecting the high-voltage terminal to power electronics of the stator and a star bar, wherein each of the three bus bars has a current input element and at least n parallel current output elements, and the star bar has at least 3n current input elements wherein $n \geq 4$, and wherein, within the high-voltage terminal, the bars are stacked one on top of the other to form a bar stack and are arranged such that they are electrically insulated from one another by means of at least one plastics element, in particular are electrically insulated from one another in a plastics element, preferably are embedded therein.

Similarly, the disclosure provides a method for producing the high-voltage terminal. According to the method according to the disclosure, the three bus bars as well as the star bar are first stacked one on top of the other to form a bar stack with an electrically insulating spacing and are then plugged into the high-voltage terminal with a plastics element and/or encapsulated by a plastic, so that the high-voltage terminal is formed.

Compared to solutions known in the prior art, the high-voltage terminal according to the disclosure represents a highly integrative solution for implementing a high-voltage terminal with 4 parallel paths or parallel conductors per phase in a small installation space. The high-voltage terminal according to the disclosure and shown here thus has three phase inputs, wherein each of the three phases is divided into four parallel branches or parallel paths in the high-voltage terminal. In its minimum configuration, the high-voltage terminal according to the disclosure preferably comprises four components, which can be embedded in a plastics element. This reduced number of components not only reduces production costs, but also allows for the particularly compact design.

Further advantageous embodiments of the disclosure are specified=below and in the claims. The features listed individually can be combined with one another in a technologically meaningful manner and can define further embodiments according to the disclosure. In addition, the features indicated in the claims are specified and explained in more detail in the description, wherein further preferred embodiments are shown.

For the purposes of the present disclosure, the term "plastics element" is understood to mean a component which is formed from a plastic and/or from a material similar to a plastic. This can be formed, for example, from a plastic film, such as a polyimide film, or a potting compound based on epoxy resin and/or acrylate. Further, the plastics element can also be formed of interconnectable components formed of, preferably consisting of, a plastic commonly used in electrical applications, such as polyphenylene sulfide (PPS), polyphthalamide (PPA), polyetheretherketone (PEEK), and/or mixtures thereof.

The respective bars of the high-voltage terminal are advantageously designed to be arc-shaped and thus have an inner and an outer circumference. This allows the high-voltage terminal as a whole to be designed as an arc-shaped component so that it can be implemented in a highly integrative manner on an annular design of a winding, in particular via the winding head between the connecting conductors of the inner and outer layers of the winding.

Advantageously, it is therefore provided that all current input elements of the star bar in the form of current input pins and the current output elements of the star bars in the form of current output pins extend in the same axial direction.

The three current input elements of each bus bar have a larger cross-section compared to the parallel current output elements, wherein the required cross-section of the current input elements always results from the number of current output elements as well as their size.

In its minimum configuration, each of the bus bars of the high-voltage terminal according to the disclosure has one current input and four current outputs according to the principle of four parallel conductors. Accordingly, in a further development, each of the bus bars can also comprise more than four parallel conductors. In its minimum configuration, the star bar has twelve inputs for the total of three phases. With n parallel current output elements for each of the three bus bars, the star bar then has at least 3n current input elements.

In order to form a particularly compact bar stack, it is therefore preferably provided that the first bus bar has a base body and, at a first distal end of the base body, two first current output pins formed perpendicularly to the base body and extending parallel to one another on the outer circumferential side, at a second distal end of the base body, two second current output pins formed perpendicularly to the base body and extending parallel to one another on the inner circumferential side, and a current input pin arranged between the first and the second current output pins on the outer circumferential side. Here, it is particularly preferred that the distance in the circumferential direction of the base body of the one current input pin to the second current output pins is smaller than the distance to the first current output pins.

Accordingly, the second bus bar preferably comprises a base body and, at a first distal end of the base body, two first current output pins formed perpendicularly to the base body and extending parallel to one another on the inner circumferential side, at a second distal end of the base body, two second current output pins formed perpendicularly to the base body and extending parallel to one another on the outer circumferential side, and a current input pin arranged between the first and the second current output pins on the outer circumferential side. In this regard, it is particularly preferred that the distance in the circumferential direction of the base body of the one current input pin to the first and second current output pins is the same.

The third bus bar preferably has a base body and, at a first distal end of the base body, two first current output pins formed perpendicularly to the base body and extending parallel to one another on the outer circumferential side, at a second distal end of the base body, two second current output pins formed perpendicularly to the base body and extending parallel to one another on the inner circumferential side, and a current input pin arranged between the first and the second current output pins on the outer circumferential side. The distance in the circumferential direction of the base body of the one current input pin to the first current output pins is advantageously smaller than the distance to the second current output pins.

The star bar therefore preferably comprises a base body and, at a first distal end, two first current input pins formed perpendicularly to the base body and extending parallel to one another on the inner circumferential side, at a second distal end of the base body, two sixth current input pins formed perpendicularly to the base body and extending parallel to one another on the outer circumferential side, and between the first and the sixth current input pins, two further second, third, fourth and fifth current input pins in each case, which are arranged alternately on the inner and outer circumferential sides in the circumferential direction of the base body. In this context, it is particularly preferably provided that the star bar has the longest extension in the circumferential direction compared to the respective bus bars.

Within the bar stack, the star bar thus advantageously forms the lowermost layer and the first bus bar the uppermost layer. The second as well as the third bus bar are arranged therebetween, wherein particularly preferably the third bus bar is arranged between the star bar and the second bus bar.

In a further aspect, the present disclosure relates to a stator winding, in particular made up of a continuous mat, or a stator comprising the high-voltage terminal according to the disclosure.

Furthermore, the present disclosure further relates to an electrical machine comprising the high-voltage terminal according to the disclosure, the stator winding according to the disclosure or the stator according to the disclosure.

BRIEF DESCRIPTION OF THE DRAWINGS

Both the disclosure and the technical field are explained in more detail below with reference to the figures. It should be noted that the disclosure is not intended to be limited by the exemplary embodiments shown. In particular, unless explicitly stated otherwise, it is also possible to extract partial aspects of the subject matter outlined in the figures and to combine them with other components and knowledge from the present description and/or figures. In particular, it should be noted that the figures and in particular the size ratios shown are only schematic in nature. Identical reference symbols indicate the same objects, so that where applicable, explanations from other figures can also be used. In the figures.

DETAILED DESCRIPTION

Figure 1:
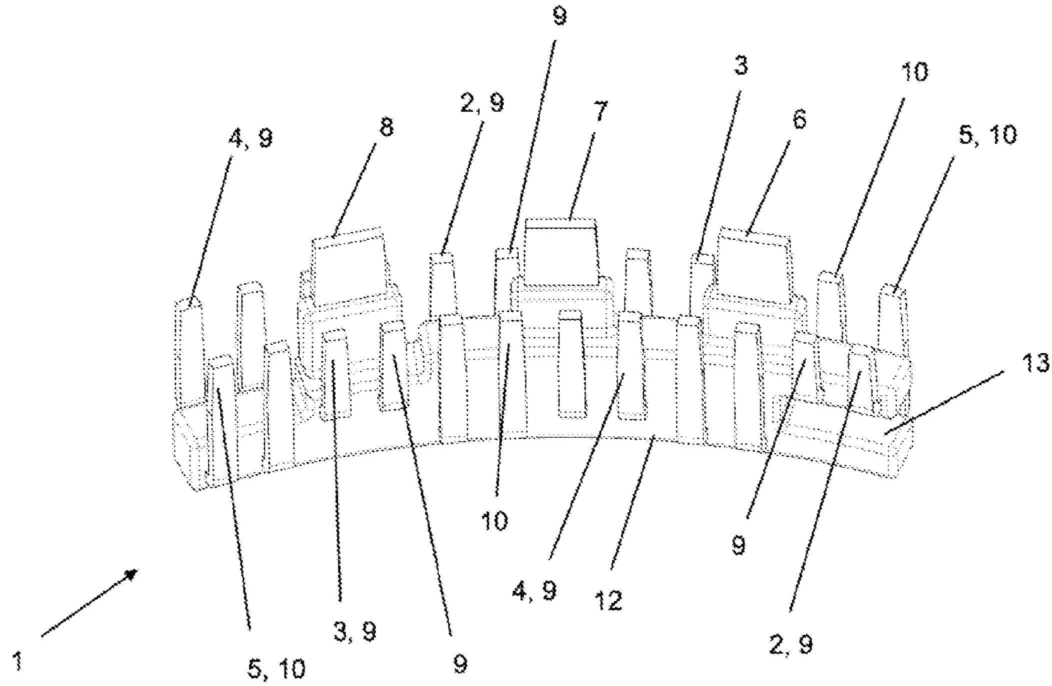
FIG. 1 shows an embodiment of the high-voltage terminal according to the disclosure in a perspective view.

FIG. 1 shows an embodiment of the high-voltage terminal 1 according to the disclosure in a perspective view, which is a component responsible for the power supply of an electrical machine (not shown) via power electronics (not shown). For this purpose, the high-voltage terminal 1 comprises three bus bars 2, 3, 4 for electrically connecting the high-voltage terminal 1 to the power electronics and a star bar 5. The respective bars 2, 3, 4, 5 are produced from an electrically conductive material, such as copper or an alloy containing copper.

Each of the three bus bars 2, 3, 4 in turn has a current input element 6, 7, 8, each of which can be electrically connected to the power electronics, and at least n parallel current output elements 9, which can be electrically contacted with a winding 34 (FIG. 8) of a corresponding stator or stator winding 33. In a minimum configuration as shown in the present figures, the star bar 5 of the high-voltage terminal 1 comprises at least 3n current input elements 10, wherein n≥4.

All the bars 2, 3, 4, 5 of the high-voltage terminal 1, of which only the respective current input elements 6, 7, 8, 10 and the current output elements 9 can be seen in the illustration shown in FIG. 1, are stacked one on top of the other within the HV terminal 1 to form a bar stack 11 (see FIG. 3) and are embedded in a plastics element 12 so as to be electrically insulated from one another, which can, for example, be formed from a single-component potting material.

In the embodiment shown here, the plastics element 12 has a mouth-like recess 13 at one of its distal ends, into which further components and/or parts, such as sensors (not shown), can be integrated.

As can further be seen from the illustration in FIG. 1, the high-voltage terminal 1 is designed in such a way that each of the three current input elements 6, 7, 8 of the respective bus bar 2, 3, 4 has a larger cross-section compared to the parallel current output elements 9. The cross-section of all current output elements 9 of each bus bar 2, 3, 4, on the other hand, is the same. Furthermore, all current output elements 9 of the bus bars 2, 3, 4 as well as all current input elements 10 of the star bar 5 extend in the same axial direction.

Figure 2:
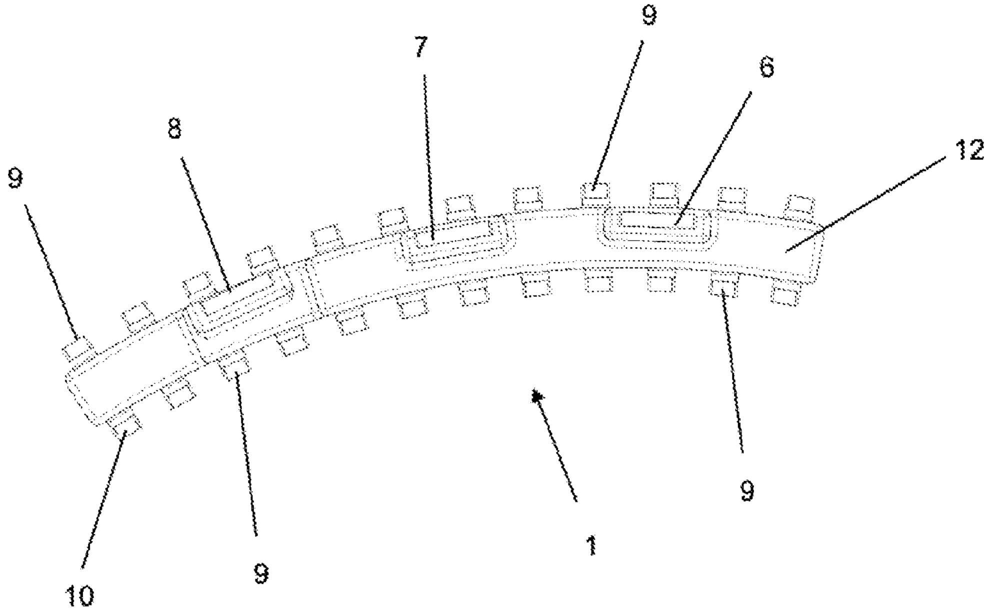
FIG. 2 shows the embodiment of the high-voltage terminal shown in FIG. 1 in a top view.

FIG. 2 shows the embodiment of the high-voltage terminal 1 shown in FIG. 1 again in a top view. As can be seen from the illustration, the current output elements 9 of the bus bars 2, 3, 4 positioned on the inner and outer circumferential sides and the current input elements 10 of the star bar 5 are arranged parallel to one another in the radial direction within the bar stack 11.

Figure 3:
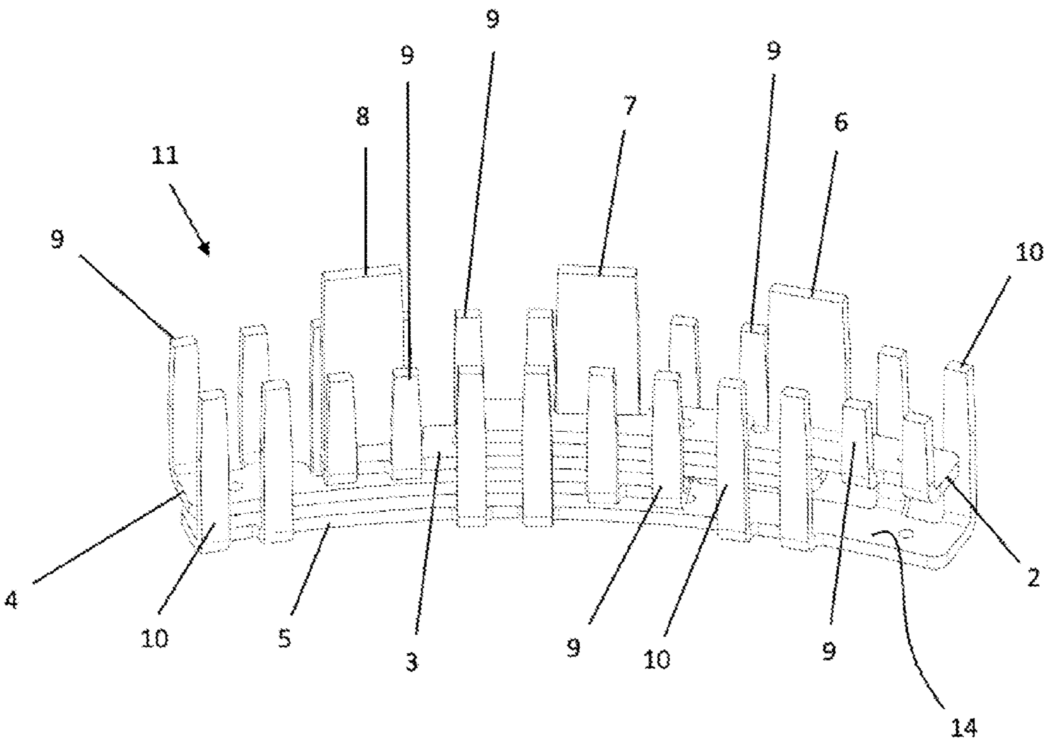
FIG. 3 shows an embodiment of a bar stack of the high-voltage terminal according to the disclosure.

FIG. 3 shows the bar stack 11 embedded in the plastics element 12 in the previous FIGS. 1 and 2. Within the bar stack 11, the star bar 5 forms the lowermost layer and the first bus bar 2 the uppermost layer. The two remaining bus bars 3, 4, i.e., the second as well as the third bus bar 3, 4 are arranged therebetween, wherein the third bus bar 4 is arranged between the star bar 5 and the second bus bar 3. Accordingly, the second bus bar 3 is positioned between the first and third bus bars 2, 4. Furthermore, it can be seen from the illustration in FIG. 3 that the first distal end of the third bus bar 4 is flush with the first distal end of the star bar 5. The second bus bar 3 arranged on the third bus bar 4 and the first bus bar 2 arranged on the second bus bar 3 are each positioned offset in the circumferential direction of the high-voltage terminal 1 in such a way that the second distal end of the first bus bar 2 is flush with the second distal end of the star bar 5. Compared to the bus bars 2, 3, 4, the base body 14 of the star bar 5 therefore has the longest extension in its circumferential direction.

In the following FIGS. 4 to 7, the individual bars 2, 3, 4, 5 of the high-voltage terminal 1 are shown and explained individually.

Figure 4:
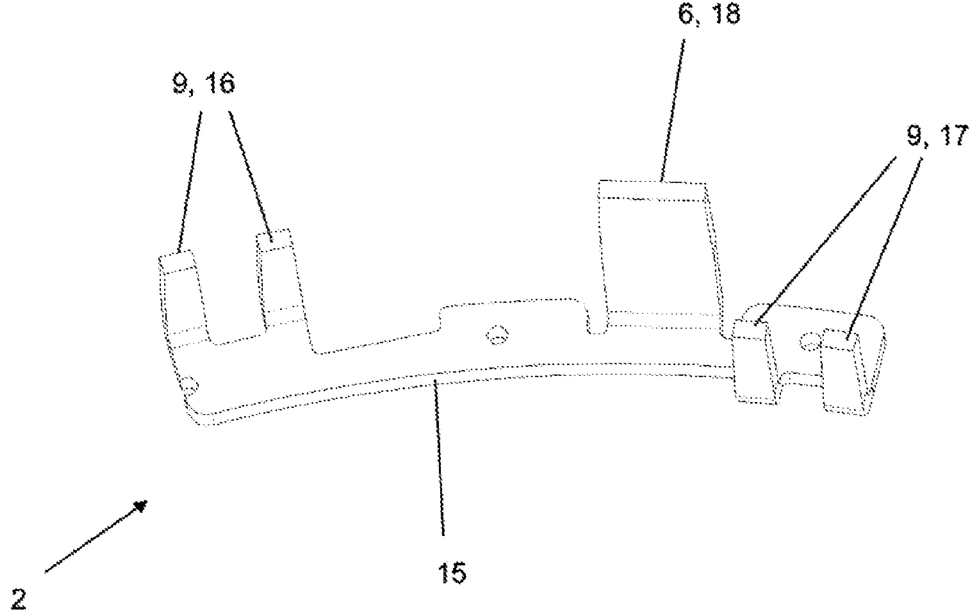
FIG. 4 shows an embodiment of a first bus bar of the bar stack shown in FIG. 3.

FIG. 4 shows an embodiment of the first bus bar 2 to which, for example, the phase connection U is applied. This first has a base body 15 which is designed to be arc-shaped in the circumferential direction and has an inner circumference and an outer circumference. The total of four current output elements 9 are formed by two current output pins 16, 17 each formed perpendicularly to the base body 15 and extending parallel to one another, wherein the two first current output pins 16 are arranged at the first distal end of the base body 15 on the outer circumferential side and the two second current output pins 17 are arranged at the second distal end of the base body 15 opposite in the circumferential direction on the inner circumferential side. As can be seen from the illustration in FIG. 4, the current input element 6 is formed by a current input pin 18 arranged between the first and the second current output pins 16, 17 on the outer circumferential side, wherein the distance of the current input pin 18 from the second current output pins 17 in the circumferential direction of the base body 15 is smaller than the distance from the first current output pin 16.

Figure 5:
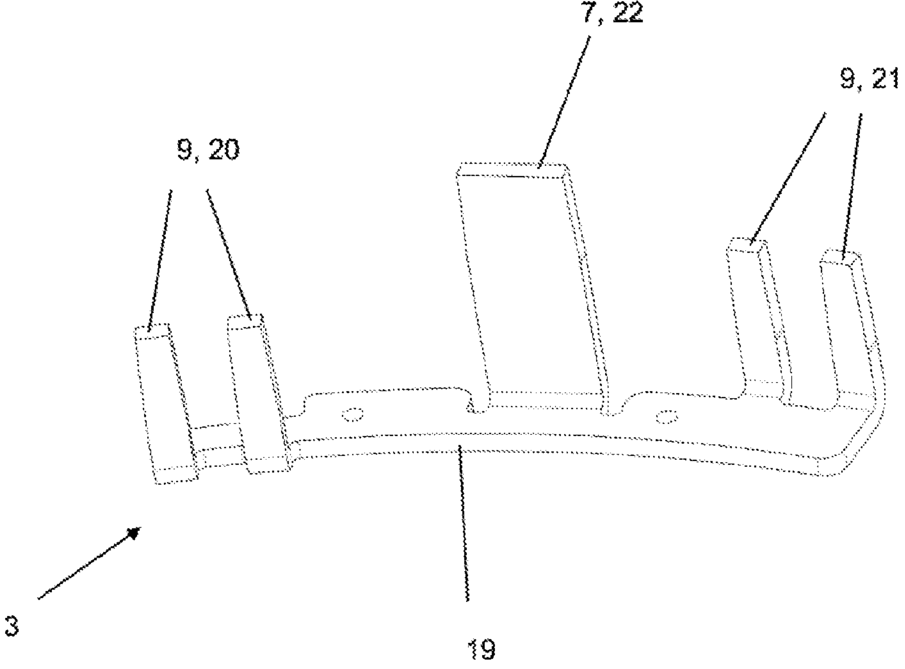
FIG. 5 shows an embodiment of a second bus bar of the bar stack shown in FIG. 3.

FIG. 5 shows an embodiment of the second bus bar 3 to which, for example, the phase connection V is applied. The second bus bar 3 also has a base body 19 which is designed to be arc-shaped in the circumferential direction and has an inner circumference and an outer circumference. The total of four current output elements 9 are also formed by two current output pins 20, 21 each formed perpendicularly to the base body 19 and extending parallel to one another, wherein the two first current output pins 20 are arranged at the first distal end of the base body 19 on the inner circumferential side and the two second current output pins 21 are arranged at the second distal end of the base body 19 opposite in the circumferential direction on the outer circumferential side. In this regard, the current input element 7 is formed by a current input pin 22 arranged between the first and the second current output pins 20, 21 on the outer circumferential side, wherein the distance of the current input pin 22 from the first and the second current output pins 20, 21 is the same in the circumferential direction of the base body 19.

Figure 6:
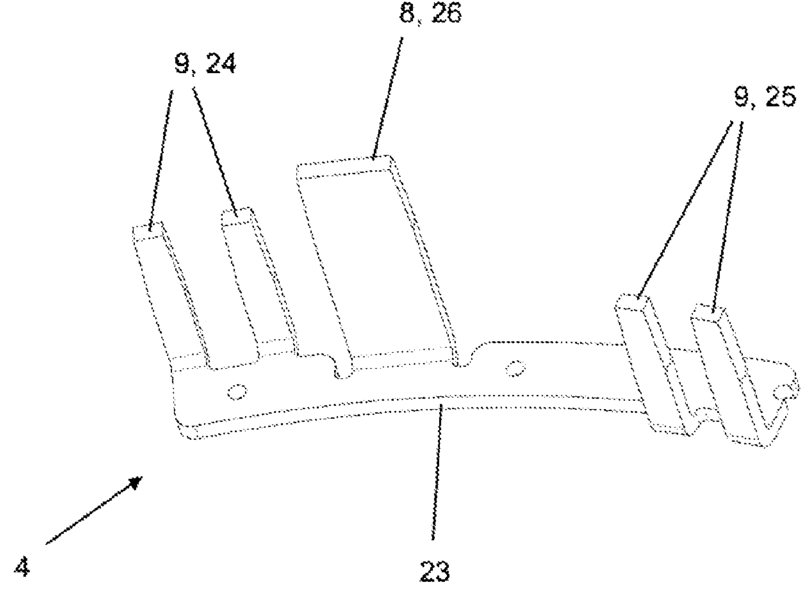
FIG. 6 shows an embodiment of a third bus bar of the bar stack shown in FIG. 3.

FIG. 6 shows an embodiment of the third bus bar 4 to which, for example, the phase connection W is applied. This, also, first has a base body 23 which is designed to be arc-shaped in the circumferential direction and has an inner circumference and an outer circumference. The total of four current output elements 9 are formed by two current output pins 24, 25 each formed perpendicularly to the base body 23 and extending parallel to one another, wherein the two first current output pins 24 are arranged at the first distal end of the base body 23 on the outer circumferential side and the two second current output pins 25 are arranged at the second distal end of the base body 23 opposite in the circumferential direction on the inner circumferential side. As can be seen from FIG. 6, the current input element 8 is formed by a current input pin 26 arranged between the first and the second current output pins 24, 25 on the outer circumferential side, wherein the distance of the current input pin 26 from the first current output pins 24 in the circumferential direction of the base body 23 is smaller than the distance from the second current output pins 25.

Figure 7:
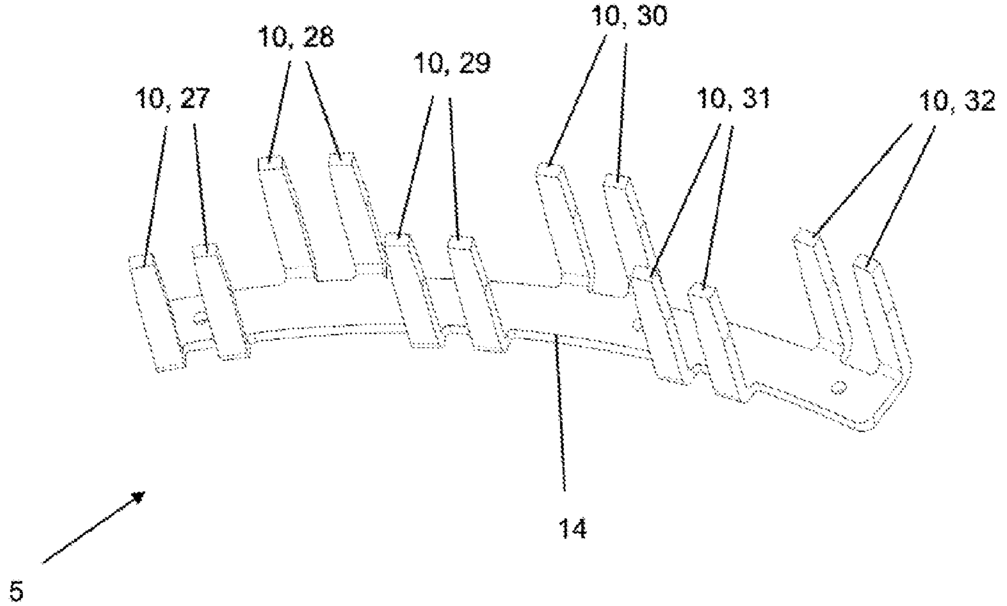
FIG. 7 shows an embodiment of a star bar of the bar stack shown in FIG. 3.

FIG. 7 shows an embodiment of the star bar 5 of the bar stack 11 shown in FIG. 3 which is also designed to be arc-shaped and has an inner circumference and an outer circumference. The star bar 5 also comprises a base body 14 with current input pins 27, 28, 29, 30, 31, 32 formed perpendicularly to the base body 14 on the inner as well as the outer circumferential side and extending parallel to one another. Of the multiple current input pins 27, 28, 29, 30, 31, 32, two first ones 27 are arranged at a first distal end of the base body 14 on the inner circumferential side and two sixth ones 32 are arranged at a second distal end opposite in the circumferential direction on the outer circumferential side. Between the first and sixth current input pins 27, 32, two further second, third, fourth and fifth current input pins 28, 29, 30, 31 are arranged in each case alternately on the inner and outer circumferential sides in the circumferential direction of the base body 14.

Figure 8:
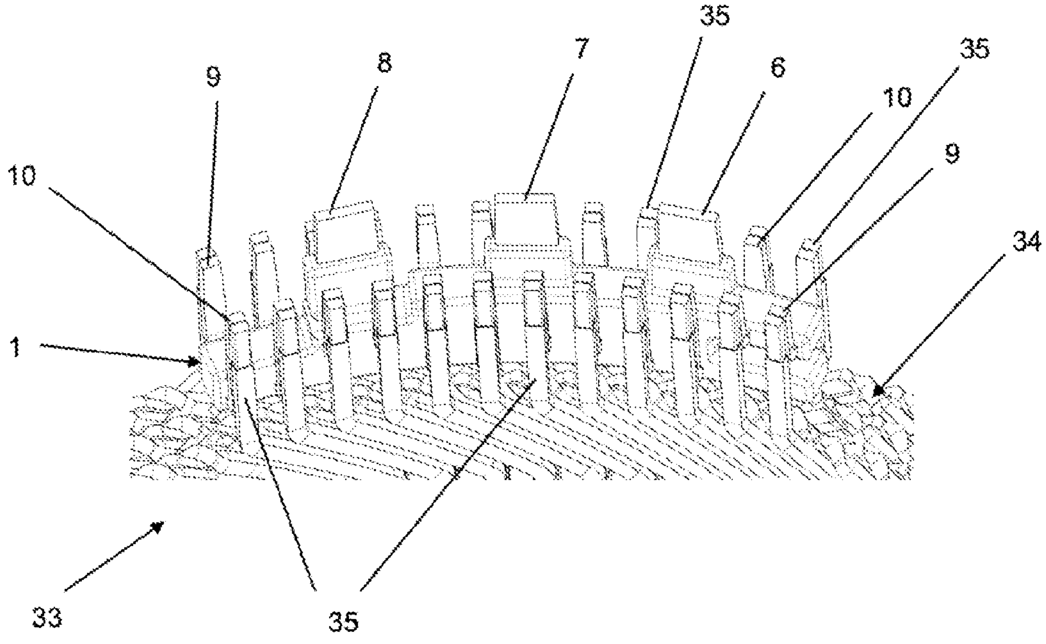
FIG. 8 shows an embodiment of a stator winding comprising the high-voltage terminal according to the disclosure.

FIG. 8 shows a section of an embodiment of a stator winding 33 with a winding 34, which in the present case is formed from a continuous mat that is usually wound and folded several times. The winding 34 has a plurality of individual conductors 35 which also extend axially, wherein the individual conductors 35 are contacted via the current output elements 9 of the respective bus bar 2, 3, 4 and the current input elements 10 of the star bar 5.

LIST OF REFERENCE SYMBOLS

1 High-voltage terminal
2 (First) bus bar
3 (Second) bus bar
4 (Third) bus bar
5 Star bar
6 Current input element
7 Current input element
8 Current input element
9 Current output element, bus bar
10 Current input element, star bar
11 Bar stack
12 Plastics element
13 Recess
14 Base body, star bar
15 Base body, first bus bar
16 Current output pins, first bus bar
17 Current output pins, first bus bar
18 Current input pin, first bus bar
19 Base body, second bus bar
20 Current output pins, second bus bar
21 Current output pins, second bus bar
22 Current input pin, second bus bar
23 Base body, third bus bar
24 Current output pins, third bus bar
25 Current output pins, third bus bar
26 Current input pin, third bus bar
27 First current input pins, star bar
28 Second current input pins, star bar
29 Third current input pins, star bar
30 Fourth current input pins, star bar
31 Fifth current input pins, star bar
32 Sixth current input pins, star bar
33 Stator winding
34 Winding
35 Conductor

The invention claimed is:

1. A high-voltage (HV) terminal for a stator, comprising:
three bus bars for electrically connecting the HV terminal to power electronics;
a star bar;
each of the three bus bars has a current input element and at least n parallel current output elements;
the star bar has at least 3n current input elements, wherein n≥4; and
within the HV terminal, the bars are stacked one on top of the other to form a bar stack and are arranged such that the bars are electrically insulated from one another by at least one plastic element; and
wherein the star bar forms a lowermost layer within the bar stack and a first of the three bus bars forms an uppermost layer, and a second and a third of the three bus bars are arranged therebetween.

2. The high-voltage terminal according to claim 1, wherein a first of the three bus bars has a base body and, at a first distal end of the base body, two first current output pins formed perpendicularly to the base body and extending parallel to one another on an outer circumferential side, at a second distal end of the base body, two second current output pins formed perpendicularly to the base body and extending parallel to one another on an inner circumferential side, and a current input pin arranged between the first and the second current output pins on the outer circumferential side.

3. The high-voltage terminal according to claim 2, wherein the first bus bar is for the phase connection U.

4. The high-voltage terminal (1) according to claim 1, wherein a second of the three bus bars has a base body and, at a first distal end of the base body, two first current output pins formed perpendicularly to the base body and extending parallel to one another on an inner circumferential side, at a second distal end of the base body, two second current output pins formed perpendicularly to the base body and extending parallel to one another on an outer circumferential side, and a current input pin arranged between the first and the second current output pins on the outer circumferential side.

5. The high-voltage terminal according to claim 4, wherein the second bus bar is for the phase connection V.

6. The high-voltage terminal according to claim 1, wherein a third one of the bus bars has a base body and, at a first distal end of the base body, two first current output pins formed perpendicularly to the base body and extending parallel to one another on an outer circumferential side, at a second distal end of the base body, two second current output pins formed perpendicularly to the base body and extending parallel to one another on an inner circumferential side, and a current input pin arranged between the first and the second current output pins on the outer circumferential side.

7. The high-voltage terminal according to claim 6, wherein the third bus bar is for the phase connection W.

8. The high-voltage terminal according to claim 1, wherein the star bar has a base body and, at a first distal end, two first current input pins formed perpendicularly to the base body and extending parallel to one another on an inner circumferential side, at a second distal end of the base body, two sixth current input pins formed perpendicularly to the base body and extending parallel to one another on an outer circumferential side, and between the first and the sixth current input pins, two further second, third, fourth and fifth current input pins in each case, which are arranged alternately on the inner and outer circumferential sides in a circumferential direction of the base body.

9. The high-voltage terminal according to claim 1, wherein the plastic element has a recess at a second distal end thereof.

10. A stator winding or a stator comprising the high-voltage terminal according to claim 1.

11. An electrical machine comprising the high-voltage terminal according to claim 1.

12. The high-voltage terminal according to claim 1, wherein the three bus bars and the star bar are electrically insulated from one another by being embedded in the plastic element.

13. The high-voltage terminal according to claim 1, wherein the third bus bar is arranged between the star bar and the second bus bar.

14. A method for producing a high-voltage (HV) terminal for a stator, the method comprising:

stacking three bus bars, provided for electrically connecting the HV terminal to power electronics, as well as a star bar one on top of the other to form a bar stack with an electrically insulating spacing; and electrically insulating the three bus bars and the star bar within the bar stack from one another with the at least one plastic element to form the high-voltage terminal;

wherein each of the three bus bars has a current input element and at least n parallel current output elements; and the star bar has at least 3n current input elements, wherein n≥4.

15. A high-voltage (HV) terminal for a stator, comprising:

first, second, and third bus bars for electrically connecting the HV terminal to power electronics;

a star bar;

each of the three bus bars has a current input element and at least n parallel current output elements;

the star bar has at least 3n current input elements, wherein n≥4;

within the HV terminal, the bars are stacked one on top of the other to form a bar stack and are arranged such that the bars are electrically insulated from one another by at least one plastic element;

the first bus bar has a base body and, at a first distal end of the base body, two first current output pins formed perpendicularly to the base body and extending parallel to one another on an outer circumferential side, at a second distal end of the base body, two second current output pins formed perpendicularly to the base body and extending parallel to one another on an inner circumferential side, and a current input pin arranged between the first and the second current output pins on the outer circumferential side;

the second bus bar has a second base body and, at a first distal end of the second base body, two second bus bar first current output pins formed perpendicularly to the second base body and extending parallel to one another on an inner circumferential side, at a second distal end of the second base body, two second base body second current output pins formed perpendicularly to the second base body and extending parallel to one another on an outer circumferential side, and a second base body current input pin arranged between the second base body first and the second current output pins on the outer circumferential side; and the third bus bar has a third base body and, at a first distal end of the third base body, two third bus bar first current output pins formed perpendicularly to the third base body and extending parallel to one another on an outer circumferential side, at a second distal end of the third base body, two third base body second current output pins formed perpendicularly to the third base body and extending parallel to one another on an inner circumferential side, and a third base body current input pin arranged between the third base body first and second current output pins on the outer circumferential side.

16. The high-voltage terminal according to claim 15, wherein the star bar has a star bar base body and, at a first distal end, two star bar first current input pins formed perpendicularly to the star bar base body and extending parallel to one another on an inner circumferential side, at a second distal end of the star bar base body, two star bar sixth current input pins formed perpendicularly to the star bar base body and extending parallel to one another on an outer circumferential side, and between the star bar first and the sixth current input pins, two star bar second, third, fourth and fifth current input pins in each case, which are arranged alternately on the inner and outer circumferential sides in a circumferential direction of the star bar base body.

17. The high-voltage terminal according to claim 15, wherein the star bar forms a lowermost layer within the bar stack and the first bus bar forms an uppermost layer, and the second and third bus bars are arranged therebetween.

18. The high-voltage terminal according to claim 15, wherein the plastic element has a recess at a second distal end thereof.

* * * * *